United States Patent [19]
Liu et al.

[11] Patent Number: 6,166,867
[45] Date of Patent: Dec. 26, 2000

[54] OBJECTIVE LENS HOLDER

[75] Inventors: Chin-Sung Liu, Miao-Li; Li-Chung Peng, Hsinchu, both of Taiwan

[73] Assignee: Acute Applied Technologies, Chutung, Taiwan

[21] Appl. No.: 09/396,496

[22] Filed: Sep. 13, 1999

[51] Int. Cl.[7] .................................. G02B 7/10; G11B 7/00
[52] U.S. Cl. ........................ 359/813; 359/823; 369/44.15
[58] Field of Search ..................................... 359/813, 814, 359/811, 823, 824; 369/44.14, 44.15, 44.16

[56] References Cited

U.S. PATENT DOCUMENTS 5,161,067 11/1992 Tomiyama et al. ..................... 359/824

FOREIGN PATENT DOCUMENTS 405266503 10/1993 Japan ............................... G11B 7/09

*Primary Examiner*—Georgia Epps
*Assistant Examiner*—Saeed Seyrafi
*Attorney, Agent, or Firm*—W. Wayne Liauh

[57] ABSTRACT

An objective lens holder applicable in a pickup head of an optical media device is disclosed. The lens holder overcomes the problems of unstable movement and complicated assembly of the conventional lens holders. The invented lens holder uses four stripe-like resilient supporting arms, which are made from a unitary sheetmetal by a press-cutting and a bending process, to support the lens carrier and the lens. One ends of the supporting arms are settled with a fixing member when the fixing member is resin-molded, and the other ends are linked with the lens carrier. Each supporting arm includes two strips which ensure the supporting arm moving stably in the tracking direction and the focusing direction respectively. The assembly is simplified by the unitary sheetmeetal workings and the resin-molding process.

17 Claims, 8 Drawing Sheets

OBJECTIVE LENS HOLDER

FIELD OF THE INVENTION

The present invention relates to an objective lens holder, and particularly relates to an objective lens holder applicable in a pickup head of an optical media device, such as a CD-ROM or DVD-ROM driver, for stably holding the objective lens when taking tracking or focusing operations.

BACKGROUND OF THE INVENTION

It has been a well known art for people to utilize a laser beam, such as semiconductor laser, in reading data from an optical recording media, such as a CD or DVD. The laser beam is focused through an objective lens in the pickup head to aim at the data tracks formed on the optical disc. Then, a photo detector transforms the laser beam reflected from the optical disc into signals corresponding to the data stored on the disc. During the reading process, a tracking signal (TS) and a focusing signal (FS) have to be obtained from the returning beam, so as to control a tracking actuator and a focusing actuator to precisely move the laser beam aiming on the desired track position.

To achieve the servo control of tracking and focusing, the objective lens has to be controllably moved in its axial direction, i.e., the focusing direction, and in the radial direction of the disc, i.e., the tracking direction. Therefore, a lens holder is needed for carrying the objective lens and assuring stable movements of the lens. The related art lens holders are as follows.

a) Wire-supported type lens holder:

As disclosed in U.S. Pat. Nos. 5,381,273; 5,555,623 or 5,587,845, a related art lens holder includes four metal wires, such as stainless steel wires, to support the objective lens. The wires are in parallel to each other, each fixed with one end to a base, and the other ends to a lens holder, so that the lens and the holder can be controlled by a tracking actuator and a focusing actuator to move in two directions for tracking and focusing.

b) Leaf-spring type lens holder:

U.S. Pat. No. 5,892,628 discloses an objective lens holder using four spring plates to support the lens. Also, in the U.S. Pat. No. 5,453,881, only a pair of spring plates are used to support the objective lens.

c) Axial sliding and rotating type lens holder:

As illustrated in U.S. Pat. No. 5,587,845, the lens with its carrier is mounted on a supporting shaft which can slide along the axial direction of the shaft, and swing pivotally on the shaft, by the controls of a focusing actuator and a tracking actuator to achieve the focusing and tracking operations.

The conventional wire-supported type lens holder uses four parallel metal wires to support the objective lens. When the holder is moving for tracking or focusing, the wires are apt to twist and cause inaccuracy to the tracking and focusing operations. In the aforementioned U.S. Pat. Nos. 5,381,273; 5,555,623 and 5,587,845, a sheet metal is cut to form two strips which are further resin molded into a base piece and a bobbin half. Two such base pieces and bobbin halves are then connected into a base unit and a holder part for supporting the objective lens. In such procedures, the metal strips are easier to be made, but the connection process is still complicated.

In the leaf-spring type lens holder of U.S. Pat. No. 5,892,628, four spring plates are used to support the objective lens, but the fabrication process is more difficult.

As for the axial sliding and rotating type lens holder, the tolerance of the lens carrier to the supporting shaft should be precisely controlled, or unfitting will occur and the lens will not be correctly positioned.

SUMMARY OF THE INVENTION

Accordingly, the primary object of the present invention is to provide a lens holder which can firmly hold the objective lens and assure an accurate motion of the lens during the tracking and focusing operations without causing any problem of twisting or bias displacement.

The objective lens holder according to the present invention utilizes four strips of resilient supporting arms to support the objective lens. The four supporting arms have straight strips which can only swing in the tracking or focusing direction respectively, i.e., stably move in a certain plane to prevent from abnormal twisting.

A second object of the present invention is to provide an objective lens holder which can be easily assembled.

The objective lens holder according to the present invention includes a lens carrier for holding the objective lens; a lens supporting frame for supporting the lens carrier and the lens; and a fixing member for fixing one end of the supporting frame.

The lens supporting frame includes an upper supporting portion and a bottom supporting portion formed respectively on two parallel planes. Each supporting portion further includes two resilient supporting arms extending in two straight line directions. One end of the supporting arms is fixed to the fixing member, and the other end thereof extends to a same point till connecting to the objective lens carrier. In other words, the two supporting arms extend radially from a center point on the objective lens carrier in two directions to the fixing member, so as to form a suspension structure of the supporting arms and the fixing member.

Each resilient supporting arms of the lens supporting frame at least includes two strips, called the first strip and the second strip, which can only swing respectively in the tracking direction and the focusing direction. The two strips are fabricated from a sheetmetal, such as phosphorized bronze thin plate, by a press-cutting process. The original pressed first and second strips are aligned in a line and linked with a portion which is further bent into a right angle to make the two strips perpendicular to each other. Therefore, the first strip and the second strip can only swing in the tracking and the focusing direction of the objective lens respectively, and enable the stable movements of the objective lens and the lens carrier in the tracking and focusing directions, and accomplish the servo-operation of tracking and focusing.

Each of the aforesaid resilient supporting arms further has a link portion connected to the second strip for connecting to the objective lens carrier. A preferred embodiment is to have the link portion in the same plane of the first strip; and the link portions of the two resilient supporting arms of a same supporting portion, i.e., the upper supporting portion or the bottom supporting portion, can be linked together, so as to link to the lens carrier of the lens by a same center point. In the embodiment, at two opposite sides of the link portions which link together, two arc cut-outs are formed for holding an axle of the objective lens carrier and connecting the resilient supporting arms and the lens carrier. After the connection, ends of the link portions will be cut off from another cut-outs to separate two resilient supporting arms into four elements. Two focusing and two tracking coils can then be mounted on these four supporting arms respectively.

The lens supporting frame formed with four resilient supporting arms is fabricated from a thin sheetmetal by press-cutting and bending processes. The other ends of the four resilient supporting arms are resin-molded into the fixing member and exposes a part from the fixing member. Then, the bridge portion among the four strips is cut off later to form four electrodes to be connected to the tracking and focusing circuits. The fixing member is made of electric-insulated resin. Therefore, the tracking signal (TS) and the focusing signal (FS) can be transmitted through the resilient arms to the tracking coils and the focusing coils respectively, and the assembly of the optical pickup head is thus simplified.

BRIEF DESCRIPTION OF DRAWINGS

The above objectives and advantages of the present invention will become more apparent from the following detailed description of the present invention when taken in conjunction with the accompanying drawings.

DETAILED DESCRIPTION OF PREFERRED EMBODIMENTS

Figure 1:
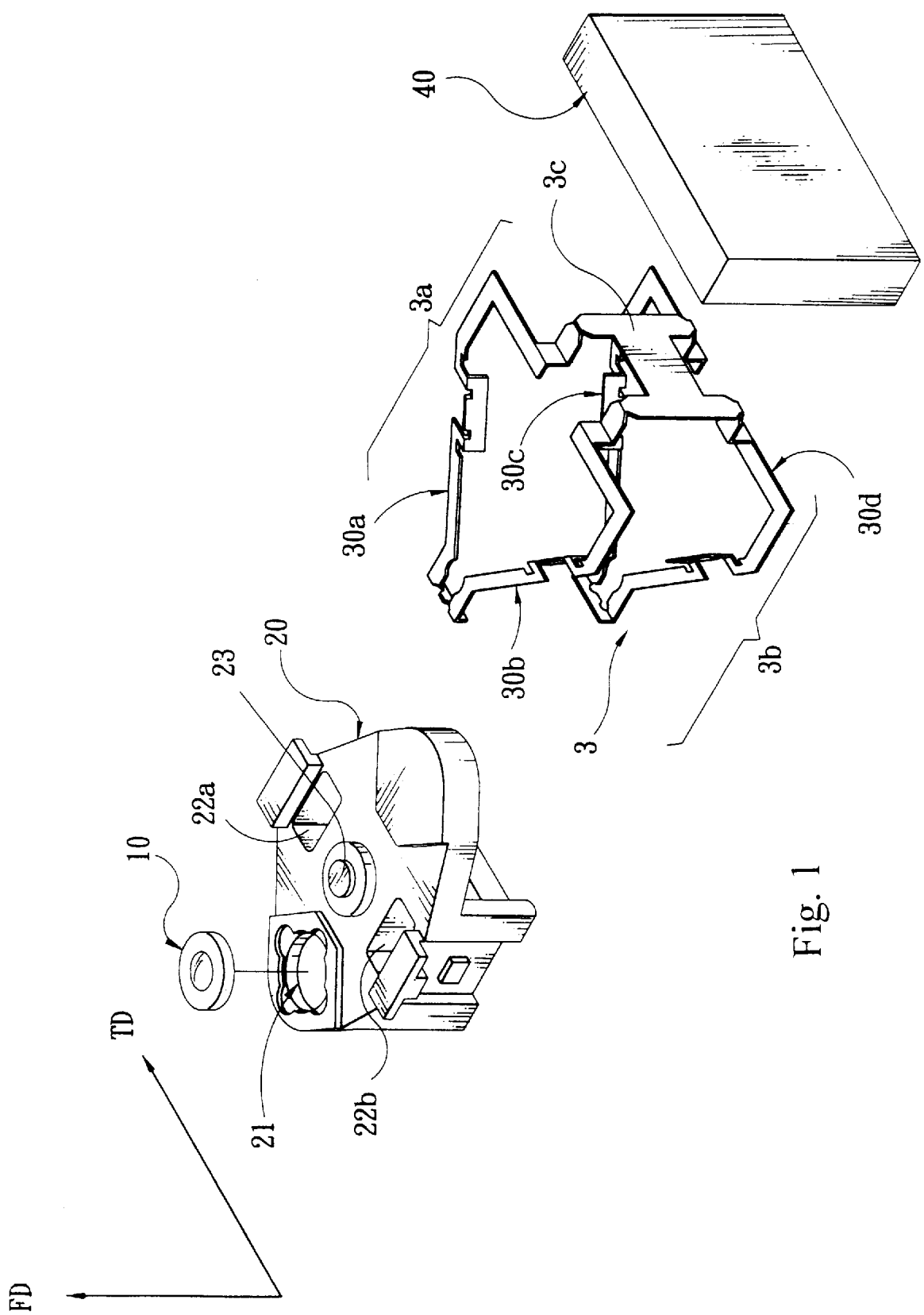
FIG. 1 is a perspective exploded view of an objective lens holder according to the present invention.

As shown in FIG. 1, the objective lens holder according to the present invention includes an objective lens 10 for focusing a laser beam onto the data-bearing surface of an optical disc; an objective lens carrier 20, having at least an access hole 21, for holding the objective lens 10 to be movable in the tracking direction TD which is the radial direction of the optical disc, and in the focusing direction which is the axial direction of the laser beam or of the objective lens 10; a lens supporting frame 3, having one end connecting to the objective lens carrier 20, for supporting the lens carrier 20 and the lens 10; and a fixing member 40, made from resin molding, for fixing the other end of the supporting frame 3, and fixedly positioned relative to the axis of the objective lens 10.

Figure 2A:
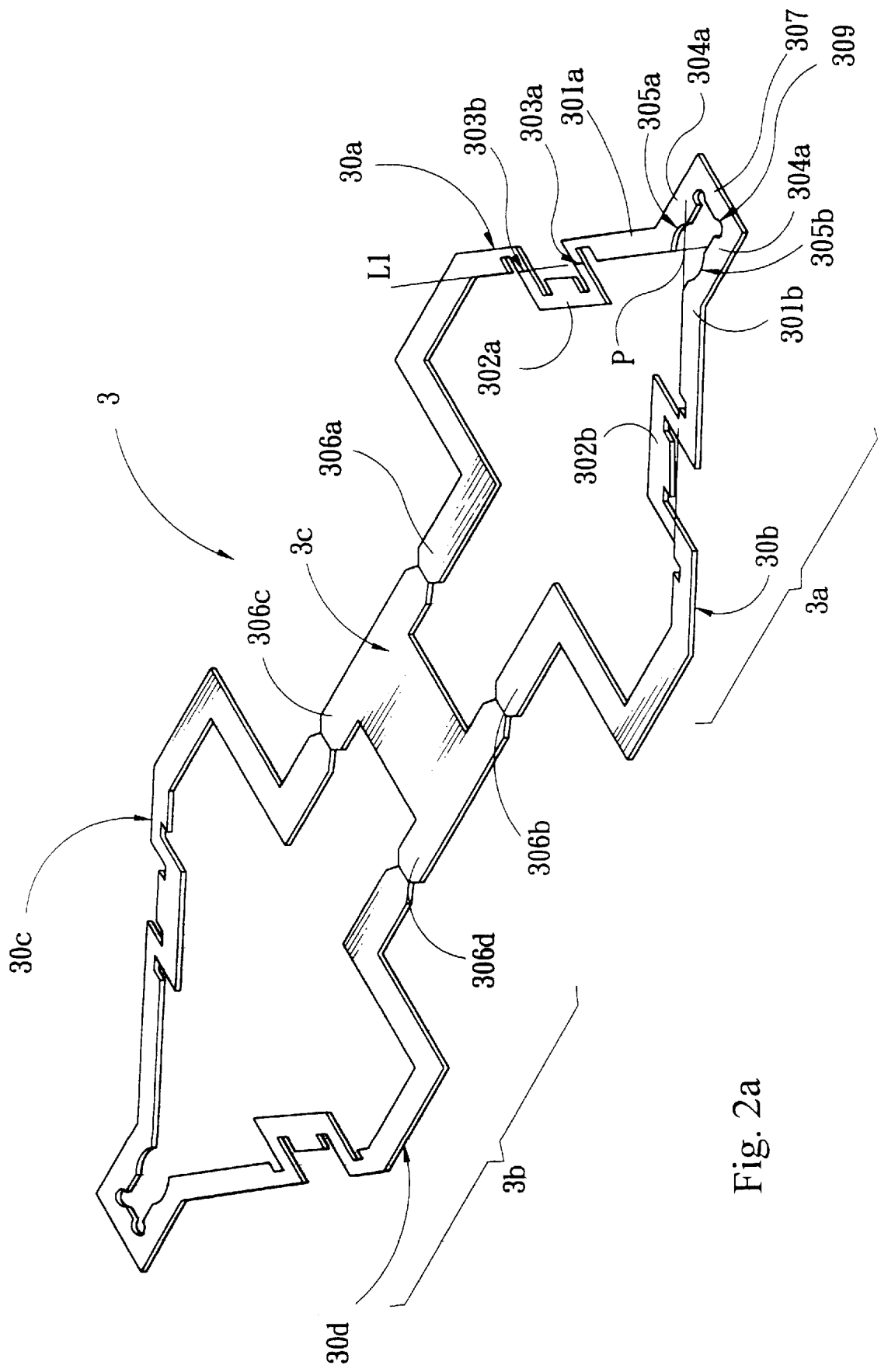
FIG. 2A is an embodiment of a lens supporting frame which is just press-cut.
Figure 2B:
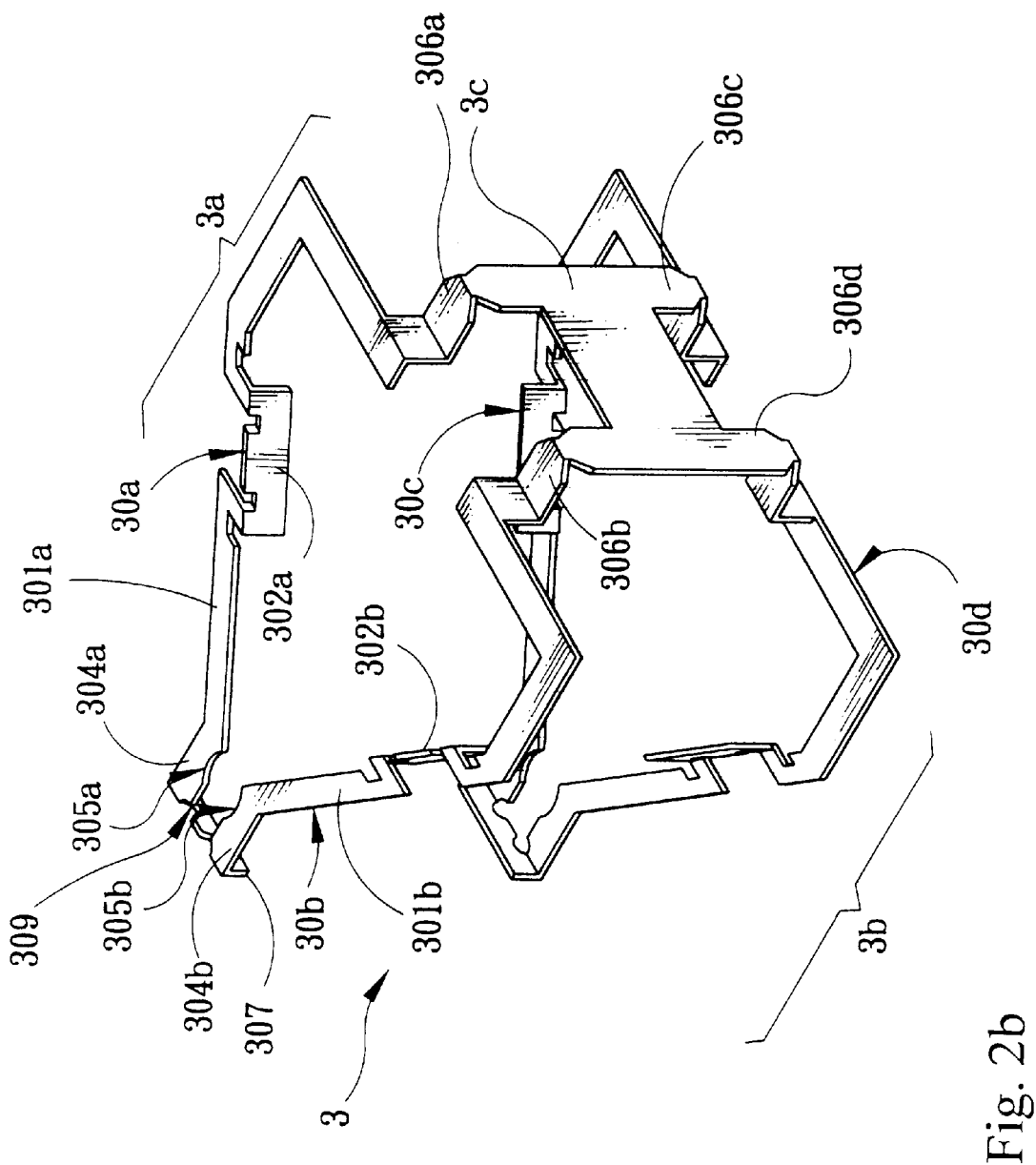
FIG. 2B is the lens supporting frame of FIG. 2A after being bent into a finished shape.

As shown in FIGS. 2A and 2B, the lens supporting frame 3 is fabricated from a sheetmetal, such as phosphorized bronze thin plate, by a press-cutting process to form a plane element as shown in FIG. 2A and further by a bending process to form a finished shape as shown FIG. 2B. It includes an upper supporting portion 3a, a bottom supporting portion 3b and a bridge portion 3c which connects the upper and the bottom supporting portions 3a, 3b. The upper and the bottom supporting portions 3a, 3b locate on two planes parallel to the optical disc. Since they are symmetrically formed with the same construction, the following is taking the upper supporting portion 3a as a representative description.

The upper supporting portion 3a includes a first resilient supporting arms 30a and a second resilient supporting arms 30b extending in two straight line directions. One end of the supporting arms is fixed to the fixing member 40, and the other end thereof extends to a same point P till connecting to the objective lens carrier 20, so as to form a suspension structure of the supporting arms 30a, 30b and the fixing member 40.

Referring to FIG. 2B, each resilient supporting arm 30a or 30b of the lens supporting frame 3 at least includes two strips, called the first strip 301a (301b) and the second strip 302a (302b), which can only swing respectively in the tracking direction TD and the focusing direction FD. The two strips 301a (301b), 302a (302b) are fabricated from a sheetmetal by a press-cutting process. The original pressed first and second strips 301a (301b), 302a (302b) as shown in FIG. 2A, are aligned in a line L1 and linked with a link portion 303a, 303b which is further bent into a right angle to make the two strips 301a (301b), 302a (302b) perpendicular to each other. Therefore, the first strip 301a (301b) and the second strip 302a (302b) can only swing in the tracking direction TD (referring to FIG. 5) and the focusing direction FD (referring to FIG. 6) of the objective lens 10 respectively, and enable the stable movements of the objective lens 10 and the lens carrier 20 in the tracking and focusing directions TD, FD, and accomplish the servo-operation of tracking and focusing.

The aforesaid resilient supporting arms 30a, 30b further have a link portion 304a, 304b connected to the first strip 301a, 301b for connecting to the objective lens carrier 20. A preferred embodiment is to have the link portion 304a, 304b in the same plane of the first strip 301a, 301b; and the link portions 304a, 304b of the two resilient supporting arms of a same supporting portion, i.e., the upper supporting portion 30a, 30b or the bottom supporting portion 30c, 30d, can be linked together, so as to link to the lens carrier 20 of the lens 10 by a same center point P. The link portions 304a, 304b are linked by an extension portion 307 so as to be easily connected with the lens carrier 20 and aligned on the center point P. After the connection, the extension portion 307 can then be cut off from cut-outs 309 to separate two resilient supporting arms 30a, 30b for serving as terminals of focusing and tracking signal respectively.

Figure 4:
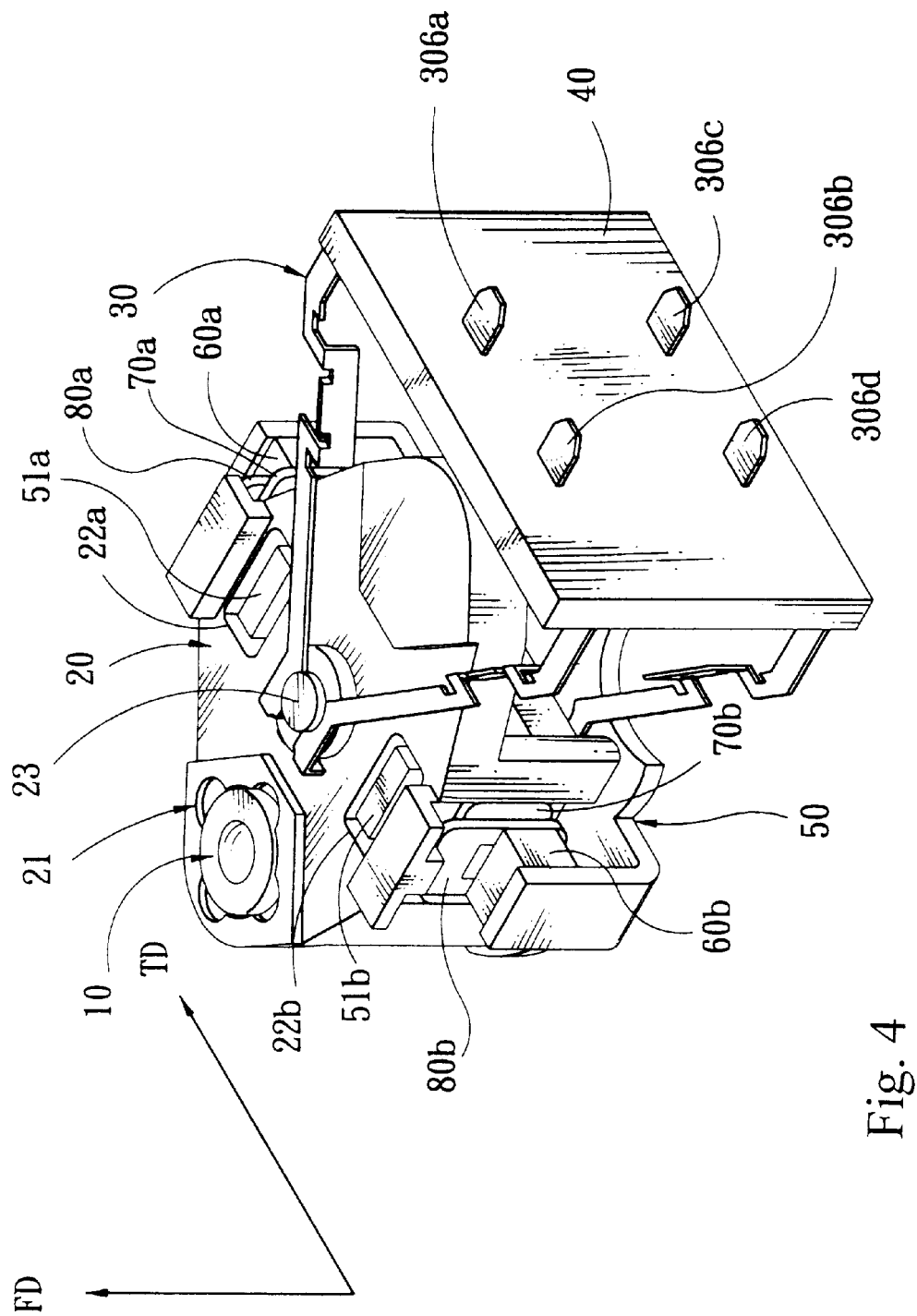
FIG. 4 is the perspective view of the lens holder assembled with the tracking and focusing actuators as an optical pickup head.

In the embodiment, at two opposite sides of the link portions 304a, 304b which link together by the extension portion 307, two arc cut-outs 305a, 305b, having a same circle center, are formed for holding an axle 23, see FIG. 4, of the objective lens carrier 20 and connecting the resilient supporting arms 30a, 30b and the lens carrier 20. By the same way, the bottom supporting portion 3b has the same configuration to connect with the other end of the axle 23. So that the objective lens carrier 20 and the lens 10 can be supported by the upper and the bottom supporting portions 3a, 3b of the lens supporting frame 3.

The other ends of the two resilient supporting arms 30a, 30b of the upper supporting portion 3a are formed with two electrodes 306a and 306b which are linked with a link portion 3c. By the same way, the third and fourth resilient supporting arms 30c, 30d of the bottom supporting portion 3b are formed also with two electrodes 306c and 306d, and linked to the link portion 3c.

The lens supporting frame 3 formed with the four resilient supporting arms 30a, 30b, 30c and 30d is fabricated from a thin sheetmetal by press-cutting and bending processes. The ends of the four resilient supporting arms 30a, 30b, 30c and 30d are resin-molded into the fixing member 40, see FIG.

Figure 3A:
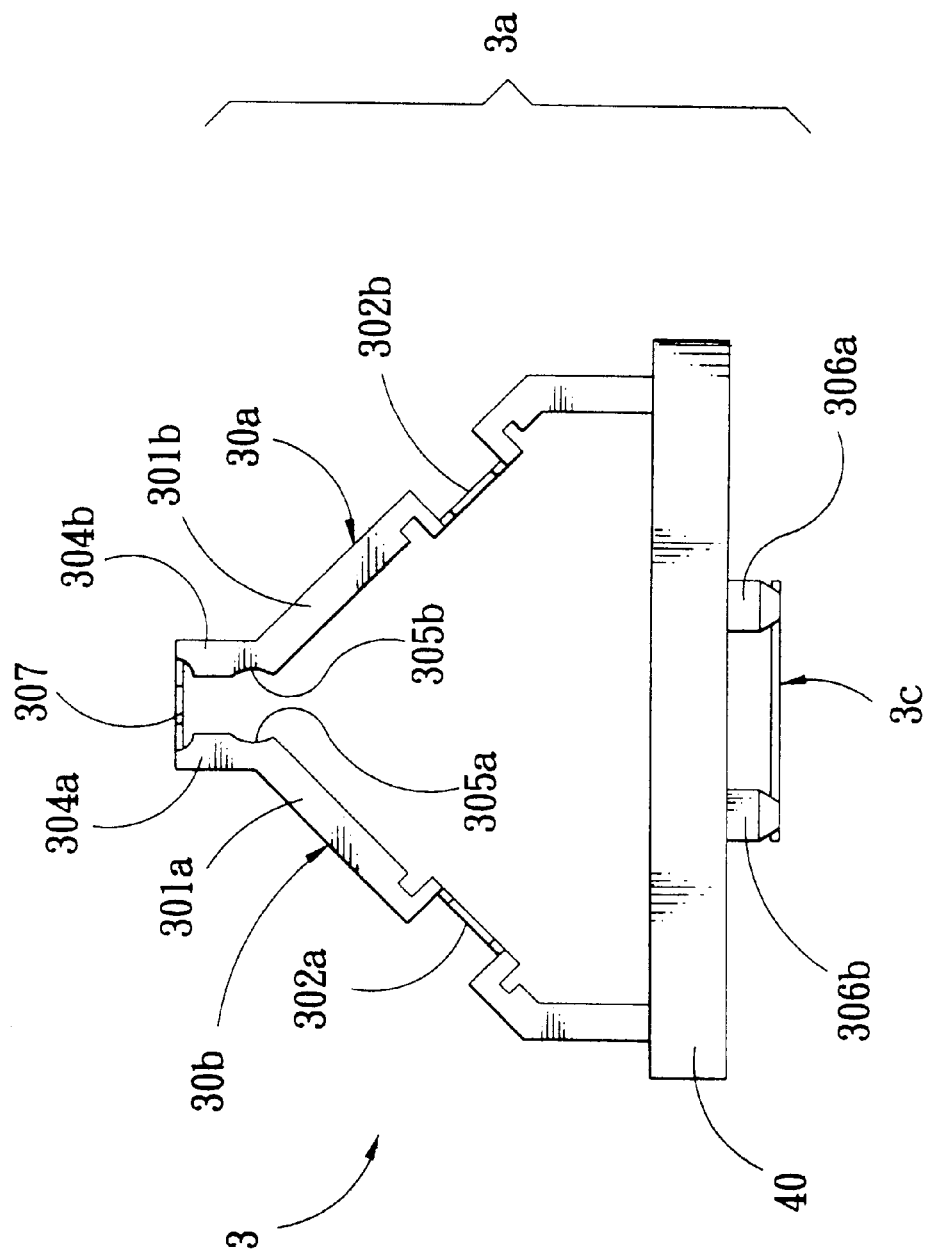
FIG. 3A is the top view the suspension structure of the lens supporting frame of FIG. 2B after being molded into the fixing member.
Figure 3B:
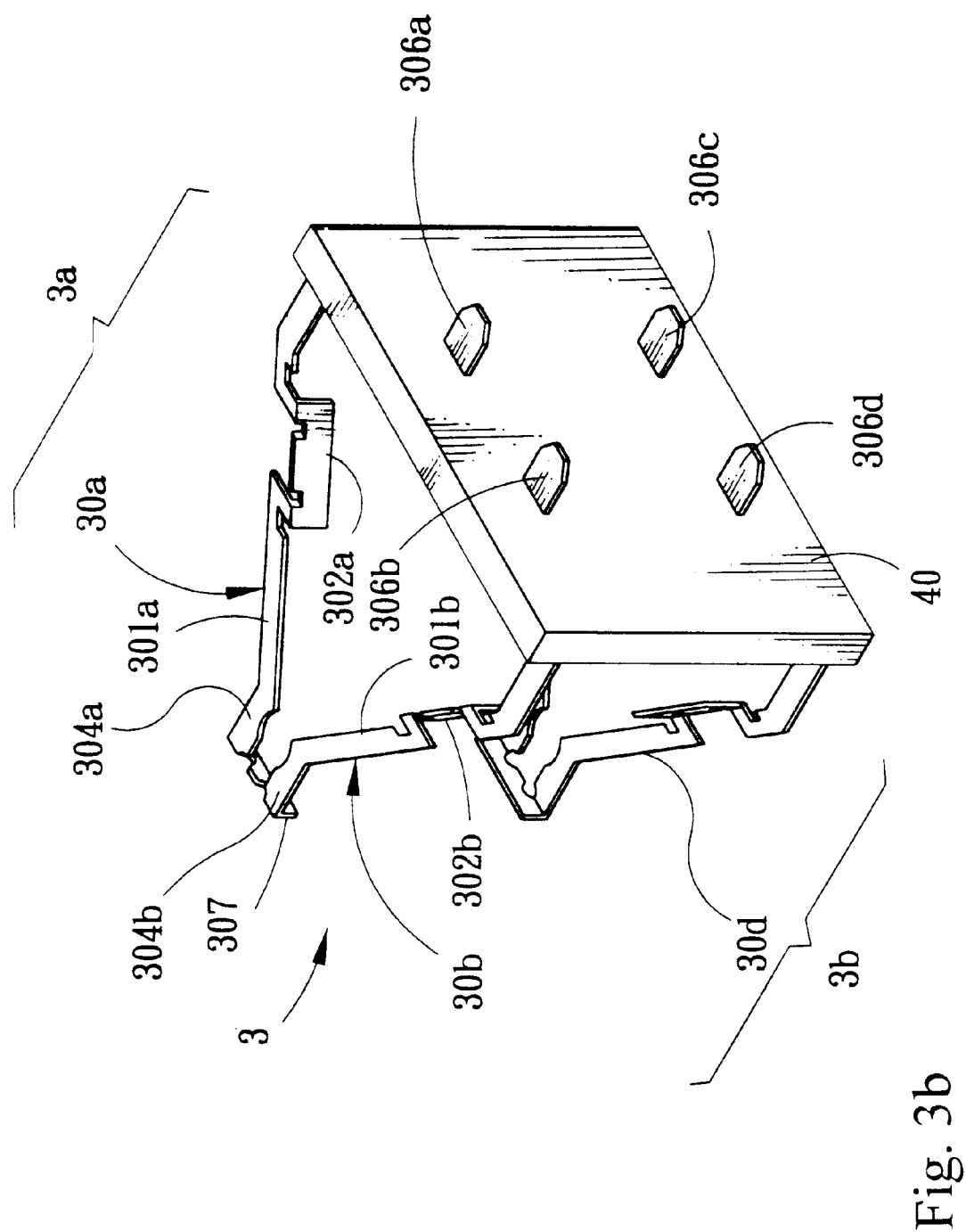
FIG. 3B is the top view of the lens supporting frame of FIG. 2B after being molded into the fixing member.

3A, and exposes a part from the fixing member 40. Then, the link portion 3c among the four resilient supporting arms 30a, 30b, 30c, 30d is cut off later to form four electrodes 306a, 306b, 306c and 306d, referring to FIG. 3B, to be connected to the unshown tracking and focusing circuits. The fixing member is made of electric-insulated resin. Therefore, the tracking signal (TS) and the focusing signal (FS) can be respectively transmitted through the resilient arms 30a, 30b and 30c, 30d to the tracking actuator and the focusing actuator, which will be described later, and the assembly of the lens supporting frame 3 for an optical pickup head is thus simplified.

Further referring to FIG. 4, a perspective view of the lens holder assembled with the tracking and focusing actuators as an optical pickup head is illustrated. The tracking and focusing actuators include a yoke 50; permanent magnets 60a, 60b; tracking coils 70a, 70b; and focusing coils 80a, 80b. The yoke 50 is located under the optical lens carrier 20 and includes two inner yokes 51a, 51b which are in parallel with each other. The inner yokes 51a, 51b are put into two holes 22a, 22b formed on the optical lens carrier 20 where the size of the holes are larger than that of the poles. Therefore, the optical lens carrier 20 can be moved freely in the tracking and focusing directions TD, FD relatively to the yoke 50.

The tracking coils 70a, 70b and the focusing coils 80a, 80b are mounted on two radial opposite sides of the optical lens carrier 20, and electrically connected to the resilient arms 30a, 30b and 30c, 30d respectively, so as to be activated by the tracking signal TS and the focusing signal FS, and function with the magnets 60a, 60b to accomplish tracking and focusing operations which will be further described with reference to the illustrations of FIG. 5 and FIG. 6.

Figure 5:
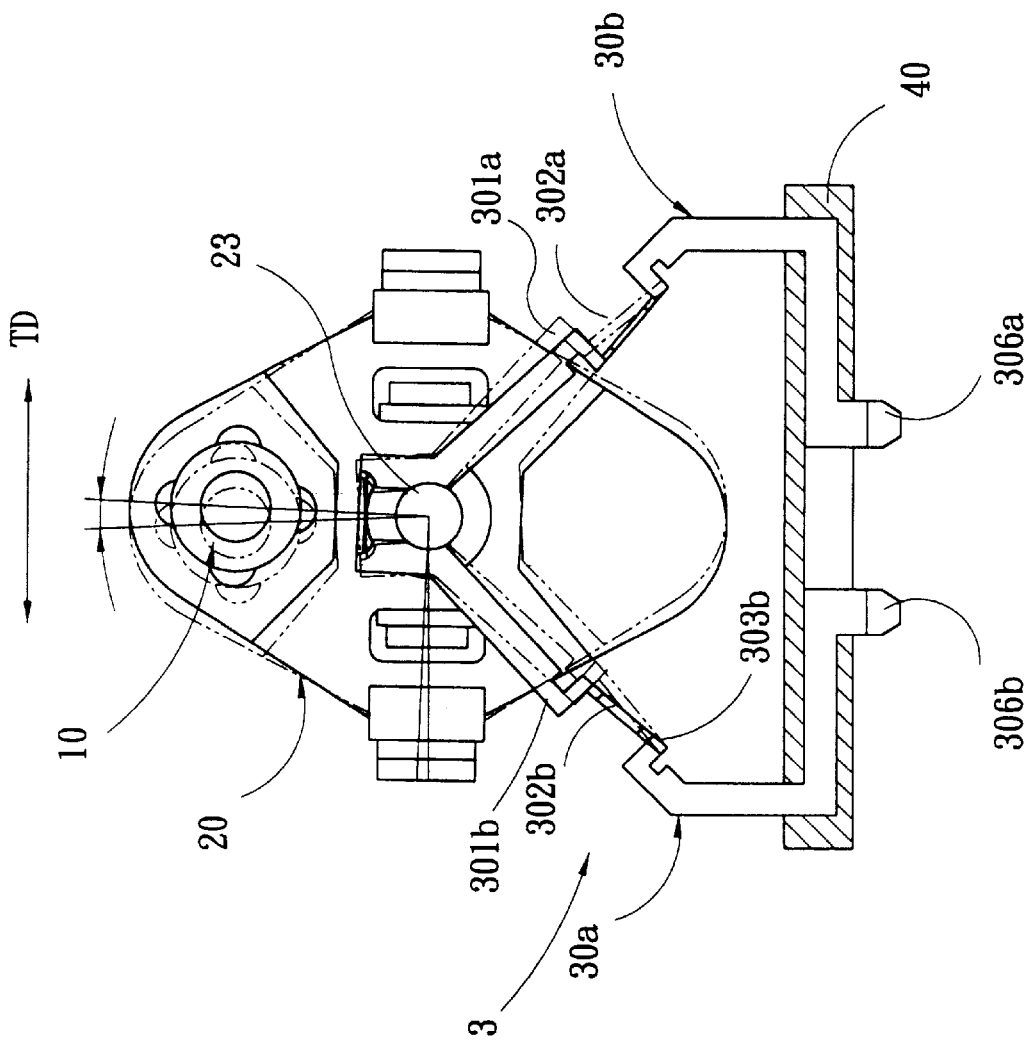
FIG. 5 is a top view showing the tracking servo control of the optical pickup head.

As shown in FIG. 5, during the tracking servo control, the objective lens 10 and the lens carrier 20 is controlled to move in the tracking direction TD. Taking the movements of the resilient supporting arms 30a, 30b of the upper supporting portion 3a for example, the second strip 302a (302b) will swing pivotally on the link portion 303 between the second strip 302a (302b) and fixing member 40 so as to move the objective lens 10 and the lens carrier 20 in the tracking direction TD. In contrast, the first strip 301a (301b) provides a suitable rigidity on the tracking direction TD to prevent itself from deformation in the tracking direction TD.

Figure 6:
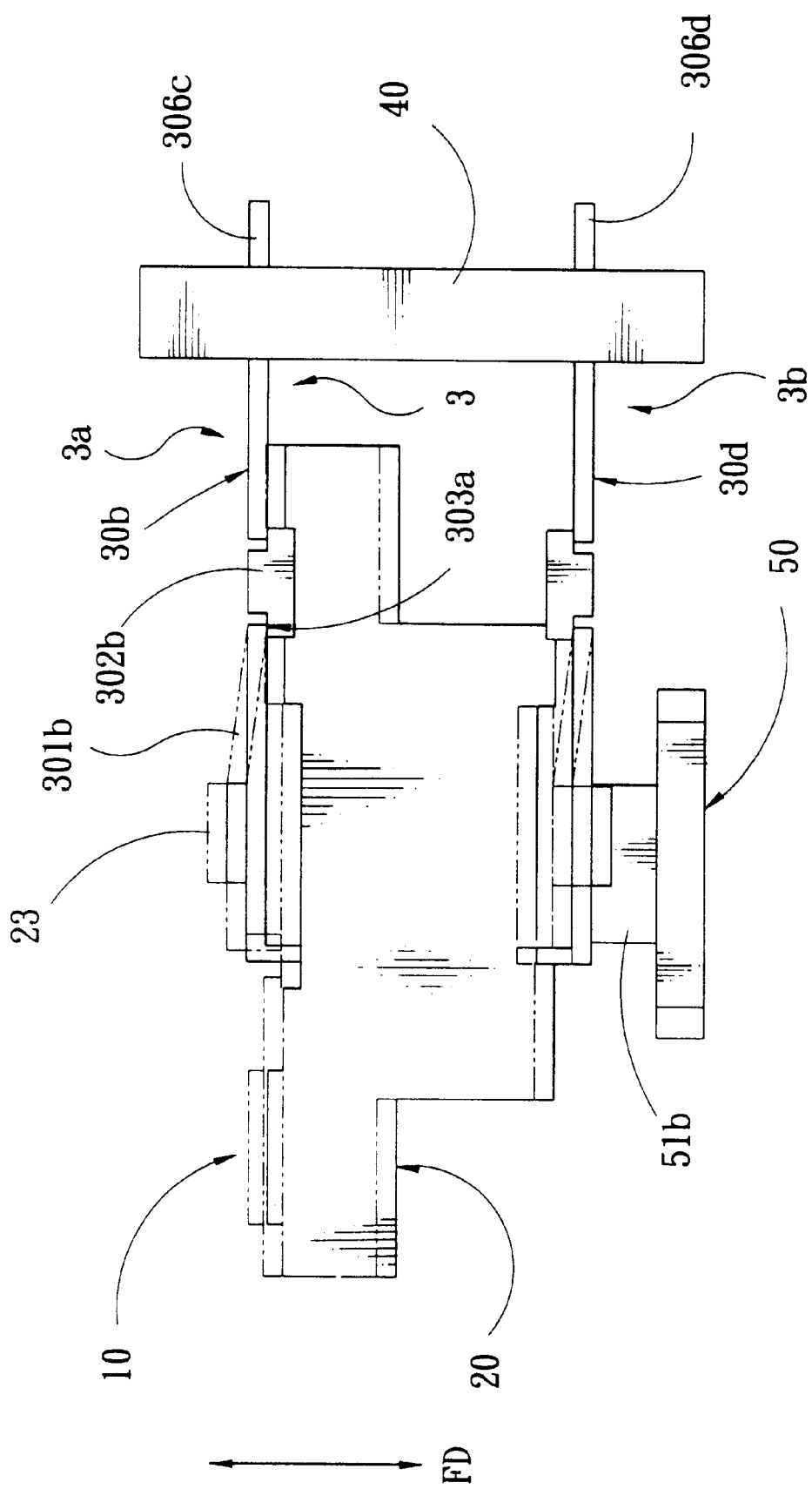
FIG. 6 is a side view showing the focusing servo control of the optical pickup head.

As shown in FIG. 6, during the focusing servo control, the objective lens 10 and the lens carrier 20 is controlled to move in the focusing direction FD. Taking the movements of the resilient supporting arms 30a, 30b of the upper supporting portion 3a for example, the first strip 301a (301b) will swing pivotally on the link portion between the first strip 301a (301b) and the second strip 302a (302b) so as to move the objective lens 10 and the lens carrier 20 in the focusing direction FD. In contrast, the first strip 301a (301b) provides a suitable rigidity on the tracking direction FD to prevent itself from deformation in the focusing direction FD.

In conclusion, the objective lens holder according to the present invention has the following advantages:

a) the twisting problem of the conventional wire-supported type lens holding device will not occur on the present invention due to the two-strip construction of the invention ensures the supporting arms moving stably in the tracking direction and the focusing direction respectively;

b) the objective lens supporting frame is also settled with the fixing member when the fixing member is resin-molded, thereby, the assembled process is further simplified; and c) the lens supporting frame is made from a unitary sheetmetal by a press-cutting and a bending process, thereby, the process is simplified.

Although the invention has been described in connection with preferred embodiments, it will be understood by those skilled in the art that various changes may be made without departing from its scope.

What is claimed is:

1. An objective lens holder for holding an objective lens of an optical pickup head, comprising:

a lens carrier, having at least an access hole for holding said objective lens, and an axle member parallel to the axis of said objective lens, capable of moving in the tracking direction and the focusing direction of said objective lens;

a fixing member for fixing a lens supporting frame, said fixing member is made of electric-insulated resin, and mounted on a fixed base relative to said lens carrier; and a lens supporting frame for supporting said lens carrier and the lens, symmetrically formed with an upper supporting portion and a bottom supporting portion in two parallel planes, each comprises two resilient supporting arms extending in straight line directions with one end thereof fixed to said fixing member, and the other end thereof connects with said axle member of said lens carrier, wherein, each said resilient supporting arm comprises a first strip capable of swinging, pivotally on a link portion between the first strip and the second strip, in the focusing direction of said objective lens; and a second strip capable of swinging, pivotally on a link portion between the second strip and the fixing member, in the tracking direction of said objective lens.

2. An objective lens holder as recited in claim 1 wherein the lens supporting frame is settled with the fixing member when the fixing member is resin-molded.

3. An objective lens holder as recited in claim 1 wherein the lens supporting frame is press-cut from a sheetmetal, then bent into a finished shape.

4. An objective lens holder as recited in claim 1 wherein the first and the second strips are aligned in a line and linked with a portion which is further bent into a right angle to make the two strips perpendicular to each other.

5. An objective lens holder as recited in claim 4 wherein each of the two resilient supporting arms of a supporting portion further comprises a link portion, positioned in the same plane of the first strip and connected to the first strip, for connecting to the axle member of the lens carrier.

6. An objective lens holder as recited in claim 5 wherein on the two resilient supporting arms of a supporting portion, two arc cut-outs are formed on opposite sides, having a same circle center, for holding the axle member of the lens carrier.

7. An objective lens holder as recited in claim 6 wherein the two resilient supporting arms are connected by an extension portion which is cut off after the link portion and the lens carrier are assembled to separate the two resilient supporting arms for serving as terminals of focusing and tracking signal respectively.

8. An objective lens holder as recited in claim 1 wherein the upper and the bottom supporting portions of the lens supporting frame further comprise a bridge portion for linking the two supporting portions.

9. An objective lens holder as recited in claim 8 wherein the bridge portion is removable from the upper and the bottom supporting portions.

10. An objective lens holder as recited in claim 8 wherein each resilient supporting arm of the supporting portion further comprises an electrode connecting to the bridge portion.

11. An objective lens holder as recited in claim 10 wherein each electrode is fixed by and exposed a part from the fixing member.

12. A lens supporting frame for holding a lens carrier and an objective lens of an optical pickup head, capable of moving in the tracking direction and the focusing direction of the objective lens, comprising:

an upper supporting portion and a bottom supporting portion symmetrically formed, and a bridge portion for linking the two supporting portions, said two supporting portions and said bridge portion are made from a thin sheetmetal;

each of said supporting portions comprises two resilient supporting arms extending in straight line directions with one end thereof fixed to a fixed position relative to the axis of said objective lens, and the other end thereof connects with a lens carrier;

each said resilient supporting arm comprises at least a first strip capable of swinging, pivotally on said fixed position relative to the axis of said objective lens, in the focusing direction of said objective lens; and a second strip capable of swinging, pivotally on a link portion between the second strip and the first strip, in the tracking direction of said objective lens.

13. A lens supporting frame as recited in claim 12 is press-cut from a sheetmetal, then bent into a finished shape.

14. A lens supporting frame as recited in claim 12 wherein the first and the second strips are aligned in a line and linked with a portion which is further bent into a right angle to make the two strips perpendicular to each other.

15. A lens supporting frame as recited in claim 14 wherein each of the two resilient supporting arms of a supporting portion further comprises a link portion, positioned in the same plane of the first strip and connected to the second strip, for connecting to the lens carrier.

16. A lens supporting frame as recited in claim 12 wherein the bridge portion is removable from the upper and the bottom supporting portions.

17. A lens supporting frame as recited in claim 12 wherein each resilient supporting arm of the supporting portion further comprises an electrode connecting to the bridge portion.

\* \* \* \* \*